Figure 1:
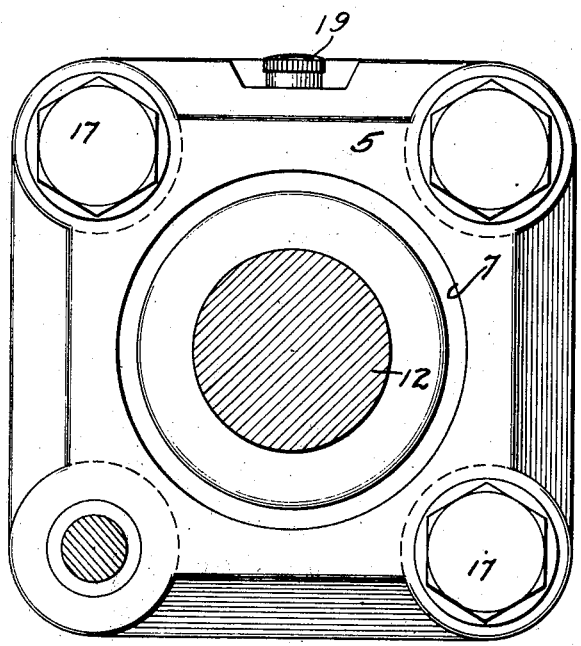

Sept. 2, 1941.  R. R. SEARLES  2,254,397

BEARING

Filed Dec. 7, 1938

INVENTOR
RAYMOND R. SEARLES
BY
Mitchell Bechert
ATTORNEYS.

Patented Sept. 2, 1941

2,254,397

UNITED STATES PATENT OFFICE 2,254,397

BEARING

Raymond R. Searles, New Britain, Conn., assignor to Fafnir Bearing Company, New Britain, Conn., a corporation of Connecticut Application December 7, 1938, Serial No. 244,339

1 Claim. (Cl. 308—184)

My invention relates to a bearing housing and particularly to a flange type bearing housing to be secured flatwise against a support.

It is an object of my invention to provide an improved sound-deadening type of bearing housing for securely holding an anti-friction bearing and serving to deaden bearing noises.

Another object is to provide an improved form of sound-deadening bearing housing which, while being securely held in place, is of a resilient nature to permit slight distortion under the influence of a bearing carried thereby.

Another object is to provide a flange type bearing housing for an anti-friction bearing, with means to facilitate assembly and means to prevent undue compression of the housing under the influence of the means for securing the same to a support.

Other objects and features of the invention will be hereinafter pointed out or will become apparent to those skilled in the art.

In the drawing which shows, for illustrative purposes only, a preferred form of the invention—

Figure 2:
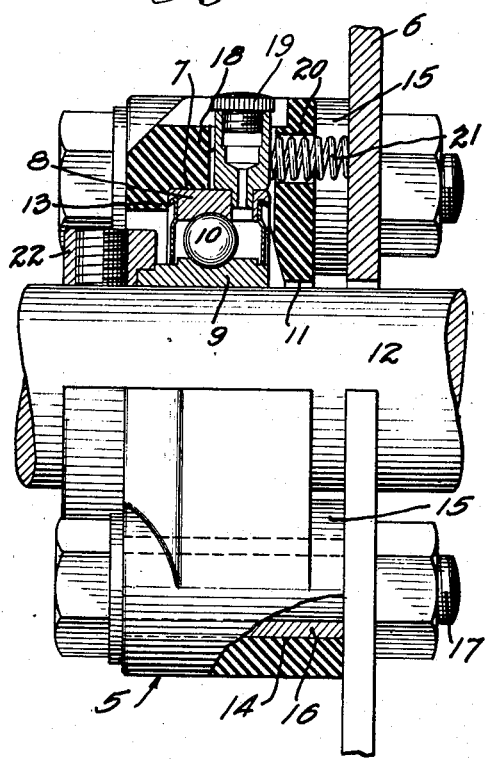

Fig. 1 is an axial view in elevation of a bearing housing and assembled bearing, illustrating features of the invention; and Fig. 2 is an edge view in quarter section of parts shown in Fig. 1.

In said drawing 5 indicates a bearing housing preferably in the form of a generally rectangular shaped, somewhat flat block to be secured to a support 6, which may be a machine frame or other part. The block 5 is preferably made of rubber, either natural or artificial, or other suitable material having equivalent sound-deadening properties. The block, substantially centrally thereof, is provided with a transversely extending bearing receiving opening or recess 7 to receive the outer ring 8 of an anti-friction bearing, including said outer ring and an inner ring 9 with interposed anti-friction bearing members 10. In the form illustrated the bottom portion of the block has a relatively smaller through bore or opening 11 for permitting passage of the shaft 12. Therefore, the bottom or base portion of the block may be said to be substantially continuous except for the shaft opening 11. The opposite side of the chamber for receiving the bearing has a larger opening, defined by an inturned lip 13, for securing the outer ring in place in the housing, as will be understood. The outer bearing ring is simply forced through the opening into the bearing receiving chamber and is held therein by the resiliency of the block 5.

The block is provided with a plurality (in this case four) of transversely extending bolt holes, as 14, which extend in a direction axially of the bearing receiving opening or chamber 7. The block at points concentric with the bolt holes preferably has round feet 15—15 for supporting the main body of the block spaced away from the support 6. The bolt holes extend completely through the body of the block and the feet 15. In each bolt hole is a spacer sleeve 16, which is of a length to limit the extent to which the block may be compressed by bolts 17, employed for securing the block to the support. The spacers 16 are preferably slightly shorter than the distance between the opposite faces of the block, so that when the bolts are secured in place the block will be slightly compressed until such compression is limited by engagement of the spacer sleeves 16 with the bolt heads or washers as illustrated.

The block 5 is provided with a lubricant fitting passage 18 extending in a direction generally radially of the bearing receiving opening and a lubricant fitting 19 of any suitable type extends through said passage 18 and is secured to the outer ring of the bearing and the passage through the fitting communicates with the interior of the bearing between the seal plates. Thus, the bearing may be readily lubricated. The block 5 is preferably also provided with a ground connection passage 20 extending in a direction at an angle to the passage 18 and a ground connection, such as a spring 21, is interposed between the metal support 6 and the lubricant fitting 19, so as to adequately ground the bearing. The inner ring 9 may be secured to the shaft 7 in any suitable manner, as by means of the eccentric locking collar 22 in a well known manner.

My improved bearing housing, while simple in construction and easy to apply, will securely hold a bearing in place and yet there will be a substantial amount of give to the housing under the influence of the bearing if there be slight misalignment. Spacing the main body of the block away from the support by means of the feet 15 further renders the block more resilient or subject to give. Any compression of the block by the bolts will not be transmitted to any substantial extent to that portion of the block directly supporting the bearing, since the bolts are substantially spaced away from the bearing receiving opening. The bearing will thus not be distorted nor its freedom of action impaired.

While the invention has been described in considerable detail and a preferred form illustrated, it is to be understood that various changes and modifications may be made within the scope of the invention as defined in the appended claim.

I claim:

A flange type bearing housing including a block of rubber to be secured to a support, the body of said block being flat and of substantially uniform thickness, said block having a transversely extending bearing receiving opening therein and located between the planes defining the sides of said block of substantially uniform thickness, a plurality of bolt holes arranged about said opening and removed therefrom, spacers in said bolt holes, feet extending from one flat side of said block and surrounding said bolt holes, said spacers extending through said feet, bolts extending through said spacers, said spacers being of a length to limit the extent of compression of said block and feet by said bolts, said feet being of a height sufficient to space the main body of said block away from the support at all points removed from said feet, whereby said block will be rigidly secured to said support but the main body thereof will be spaced therefrom so as to render said main body slightly more resilient when distorted under the influence of an anti-friction bearing in said bearing receiving opening.

RAYMOND R. SEARLES.